United States Patent
Geib et al.

(10) Patent No.: US 7,315,904 B2
(45) Date of Patent: Jan. 1, 2008

(54) RESOURCE ALLOCATION AMONG MULTIPLE APPLICATIONS BASED ON AN ARBITRATION METHOD FOR DETERMINING DEVICE PRIORITY

(75) Inventors: Kenneth M. Geib, San Diego, CA (US); Srinivas Patwari, San Diego, CA (US); Brian Harold Kelley, San Diego, CA (US)

(73) Assignee: QUALOMM Incorporated, San Diego, CA (US)

( * ) Notice: Subject to any disclaimer, the term of this patent is extended or adjusted under 35 U.S.C. 154(b) by 344 days.

(21) Appl. No.: 10/854,984

(22) Filed: May 26, 2004

(65) Prior Publication Data
US 2005/0268302 A1   Dec. 1, 2005

(51) Int. Cl.
*G06F 3/00* (2006.01)
*G06F 5/00* (2006.01)

(52) U.S. Cl. ............... 710/5; 710/6; 710/41; 709/224; 709/226; 718/104

(58) Field of Classification Search ............ 710/6, 710/41, 5
See application file for complete search history.

(56) References Cited

U.S. PATENT DOCUMENTS

| | | | | |
|---|---|---|---|---|
| 5,812,875 | A * | 9/1998 | Eneboe | 710/20 |
| 2002/0065867 | A1 * | 5/2002 | Chauvel | 709/104 |
| 2002/0120744 | A1 * | 8/2002 | Chellis et al. | 709/226 |
| 2003/0154233 | A1 * | 8/2003 | Patterson | 709/104 |
| 2004/0199635 | A1 | 10/2004 | Ta et al. | |

* cited by examiner

*Primary Examiner*—Donald Sparks
*Assistant Examiner*—Brooke J Dews
(74) *Attorney, Agent, or Firm*—Robert J. O'Connell; James T. Hagler (57) ABSTRACT

System for dynamic arbitration of a shared resource on a device. A method is provided for arbitrating the allocation of a device resource on a device. The method comprises receiving a request from a requesting application that requests allocation of the device resource, and determining that the device resource is owned by an owning application. The method also comprises associating owner information with requester information to form an arbitration request, wherein the owner information comprises information about the owning application and the requester information comprises information about the requesting application. The method also comprises arbitrating the arbitration request to produce an arbitration decision that indicates whether or not the device resource should be allocated to the requesting application, and allocating the device resource based on the arbitration decision.

20 Claims, 7 Drawing Sheets

RESOURCE ALLOCATION AMONG MULTIPLE APPLICATIONS BASED ON AN ARBITRATION METHOD FOR DETERMINING DEVICE PRIORITY

BACKGROUND

1. Field

The present invention relates generally to the operation of a device, and more particularly, to a system for dynamic arbitration of a shared resource on a device.

2. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available. For example, wireless device owners may now download a wide variety of applications for execution on their devices.

Other advances in technology have resulted in smaller and more powerful personal computing devices. For example, there currently exists a variety of portable wireless telephones, personal digital assistants (PDAs), and paging devices that are small, lightweight, and can be easily carried by users. Typically, these devices are severely resource constrained. For example, the screen size, amount of available memory and file system space, amount of input and output capabilities and processing capability may be each limited by the small size of the device.

Resource allocation has become increasingly important as a result of the increase in downloadable applications on a wide variety of computing devices including severely resource constrained personal computing devices. Device resources include displays, keypads, sound processors, modems, storage devices, communication channels, and other types of device resources. Because each device has a limited number of resources, particularly those devices that are severely resource constrained, the way device resources are allocated to competing applications determines how the device operates. For example, a wireless telephone may be in a voice call, a data call, running an application, handling an SMS message, etc. Given these various states, there currently exists no dynamic, simple and efficient mechanism to determine which application should get control of a device resource on the device during these various states. For example if a music program is playing sounds and telephone call comes in, the ringer/voice application should get the sound resource. During this same time, should a calendar alarm or an SMS notification also get access to the sound resource? Thus, there is a need to effectively arbitrate between competing applications executing on a device to determine which application should get access to a particular device resource.

In current systems, resource arbitration is typically done either using a simple first-come-first-serve process, or by a set of strict priority-based decisions. In either case, the arbitration algorithm is hard-coded and does not take into account the dynamic environment in which current devices operate. Additionally, network carriers, device manufacturers, and application developers would like to have some dynamic control as to how device resources are allocated on a device. Unfortunately, current arbitration systems using static arbitration techniques cannot satisfy this need.

Therefore, what is needed is a dynamic arbitration system that allows device resources on a device to be dynamically allocated to competing applications executing on the device. This system should also provide a mechanism to allow third parties, such as network carriers, to have an input as to how the device resources on the device are allocated.

SUMMARY

In one or more embodiments, a dynamic arbitration system comprising methods and apparatus is provided to allow device resources on a device to be dynamically allocated. In one embodiment, a method is provided for arbitrating the allocation of a device resource on a device. The method comprises receiving a request from a requesting application that requests allocation of the device resource, and determining that the device resource is owned by an owning application. The method also comprises associating owner information with requester information to form an arbitration request, wherein the owner information comprises information about the owning application and the requester information comprises information about the requesting application. The method also comprises arbitrating the arbitration request to produce an arbitration decision that indicates whether or not the device resource should be allocated to the requesting application, and allocating the device resource based on the arbitration decision.

In one embodiment, apparatus is provided for dynamically arbitrating the allocation of a device resource on a device. The apparatus comprises a resource manager that comprises logic to receive a request from a requesting application that requests allocation of the device resource, logic to determine that the device resource is owned by an owning application, and logic to associate owner information with requester information to form an arbitration request, wherein the owner information comprises information about the owning application and the requester information comprises information about the requesting application. The apparatus also comprises a resource arbiter that operates to arbitrate the arbitration request to produce an arbitration decision that indicates whether or not the device resource should be allocated to the requesting application.

In one embodiment, apparatus is provided for arbitrating the allocation of a device resource on a device. The apparatus comprises means for receiving a request from a requesting application that requests allocation of the device resource, and means for determining that the device resource is owned by an owning application. The apparatus also comprises means for associating owner information with requester information to form an arbitration request; wherein the owner information comprises information about the owning application and the requester information comprises information about the requesting application. The apparatus also comprises means for arbitrating the arbitration request to produce an arbitration decision that indicates whether or not the device resource should be allocated to the requesting application, and means for allocating the device resource based on the arbitration decision.

In one embodiment, a computer-readable media is provided that comprises instructions, which when executed by a processor in a device; operate to dynamically arbitrate the allocation of a device resource in the device. The computer-readable media comprises instructions for receiving a request from a requesting application that requests allocation of the device resource, and instructions for determining that the device resource is owned by an owning application. The computer-readable media also comprises instructions for associating owner information with requester information to form an arbitration request; wherein the owner information comprises information about the owning application and the requester information comprises information about the requesting application. The computer-readable media also comprises instructions for arbitrating the arbitration request to produce an arbitration decision that indicates whether or not the device resource should be allocated to the requesting application, and instructions for allocating the device resource based on the arbitration decision.

Other aspects, advantages, and features of the present invention will become apparent after review of the hereinafter set forth Brief Description of the Drawings, Detailed Description, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a dynamic allocation system that operates to dynamically allocate device resources in a device. In one embodiment, applications request the allocation of a device resource by transmitting an allocation request to a resource manager. In one embodiment, the allocation request comprises requester information that describes the requesting application. If the device resource is currently owned by an application (owner application), the requester information is combined with owner information to form an arbitration request. In one embodiment, the owner information describes the owner application and status of the device resource. A resource arbiter processes the arbitration request according to arbitration rules to produce an arbitration decision that indicates how the device resource is to be allocated. The arbitration decision is then used to allocate the device resource. The system is suitable for use with any type of wired or wireless device, including, but not limited to, desktop computers, notebook computers, wireless telephones, pagers, PDAs, email devices, tablet computers, or any other type of wired or wireless devices.

In one or more embodiments, the allocation system interacts with a runtime environment executing on the device that is used to simplify operation of the device, such as by providing generalized calls for device specific resources. One such runtime environment is the Binary Runtime Environment for Wireless® (BREW™) software platform developed by QUALCOMM, Inc., of San Diego, Calif. In the following description, it will be assumed that one embodiment of the dynamic allocation system is implemented using a wireless device that is executing a runtime environment, such as the BREW software platform. However, one or more embodiments of the dynamic allocation system are suitable for use with other types of runtime environments to dynamically allocate device resources on wired and wireless devices. Furthermore, the term "device resource" is used herein to describe any type of hardware or software resource on a device, including but not limited to, a display, sound processor, speaker, keypad, modem, network interface, file system, storage device, or any other type of device resource that may be part of the device.

Figure 1:
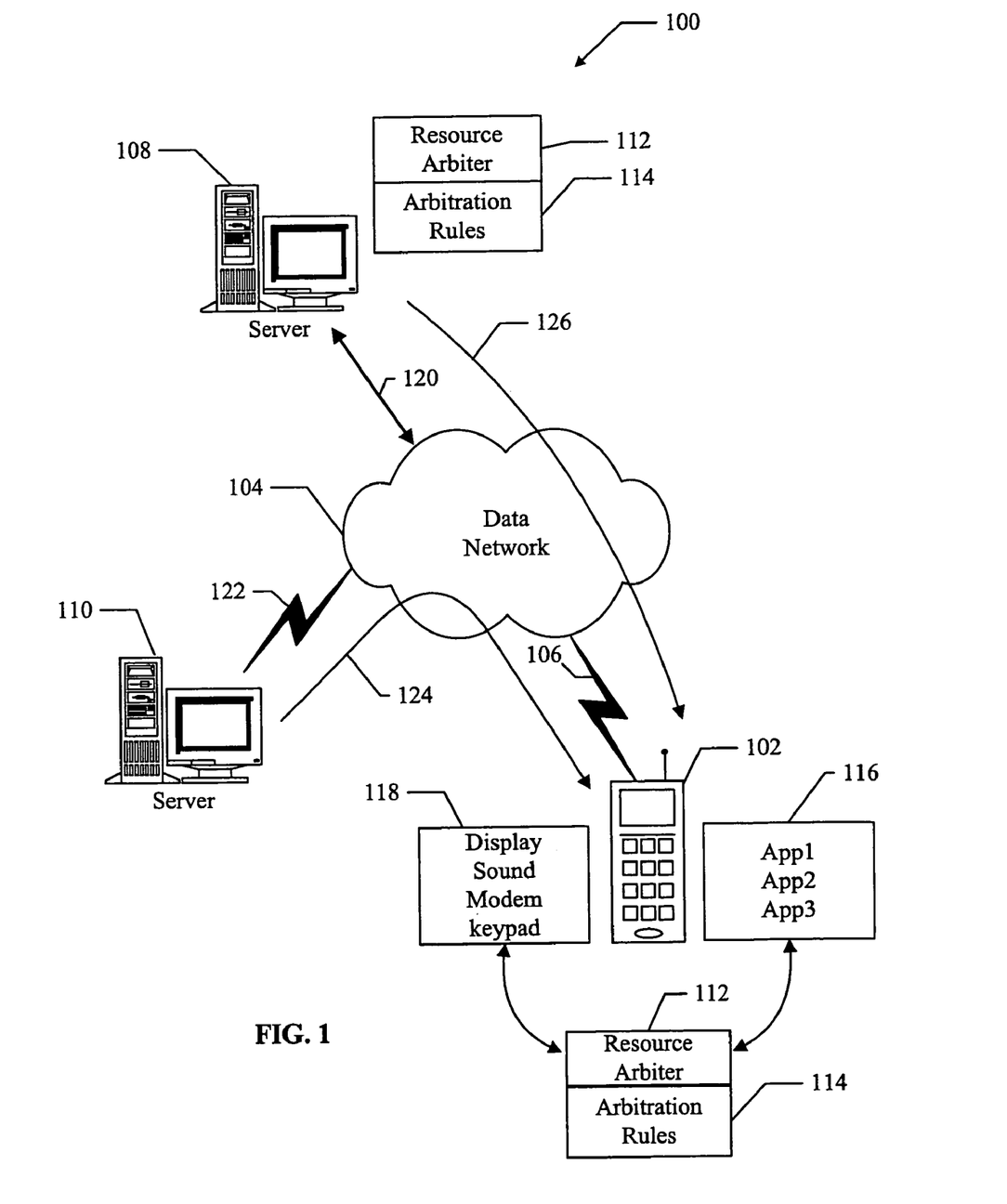
FIG. 1 shows one embodiment of a dynamic allocation system that operates to allocate device resources in a device.

FIG. 1 shows one embodiment of a dynamic allocation system 100 that operates to allocate device resources on a device. The system 100 comprises a device 102, here a wireless terminal that communicates with a data network 104 via a wireless communication channel 106. The data network 104 comprises any type of data network that may include, but is not limited to, a wired, wireless, private, or public data network, or any combination thereof.

The system 100 also comprises a server 108 that is coupled to the data network 104 via a communication channel 120 to provide services to devices in communication with the data network 104. For example, the device 102 may be a wireless telephone, and the server 108 may be part of a nationwide telecommunications network that provides telecommunication services to the telephone. The communication channel 120 may be any type of wired or wireless communication channel.

Also in communication with the data network 104 is a second server 110. The second server 110 is also in communication with the data network 104 via a wireless communication channel 122. The second server 110 may be any type of server that operates to provide services to network entities in communication with the data network 104.

In one embodiment, the device 102 comprises a resource arbiter 112 and arbitration rules 114. The resource arbiter 112 operates to arbitrate requests for device resources on the device 102 based on the arbitration rules 114. For example, the device 102 includes applications 116 that execute on the device 102 to provide features and functions desirable by the device user. For example, applications 116 may be downloaded to the device 102 from the second server 110 as shown at 124. During their execution, the applications 116 attempt to control one or more device resources 118 on the device 102. For example, in FIG. 1 the device resources 118 comprise a device display, sound processor, modem and keypad, however, the device resources 118 may comprise any other device resource as described above. The resource arbiter 112 operates to receive arbitration requests to arbitrate which of the applications 116 should be allocated access to the device resources 118. The resource arbiter 112 processes the arbitration requests according to the arbitration rules 114 to produce an arbitration decision that indicates how to allocate the device resources 118 to the applications 116.

In one embodiment, the resource arbiter 112 and the arbitration rules 114 are downloaded to the device 102 from the server 108, as shown by 126. Thus, by downloading a particular version of the resource arbiter 112 and/or a particular set of the arbitration rules 114, it is possible for the server 108 to dynamically control how device resources 118 are allocated on the device 102.

In one or more embodiments, the server 108, the device 102, and the second server 110 may be any type of computing devices and their associated connections to the data network 104 may be wireless, wired, or any combination thereof. Thus, embodiments of the dynamic arbitration system operate to allow a server to control how device resources are allocated on a device 102, and these embodiments may be implemented using virtually any network configuration having a variety of servers and terminals.

Figure 2:
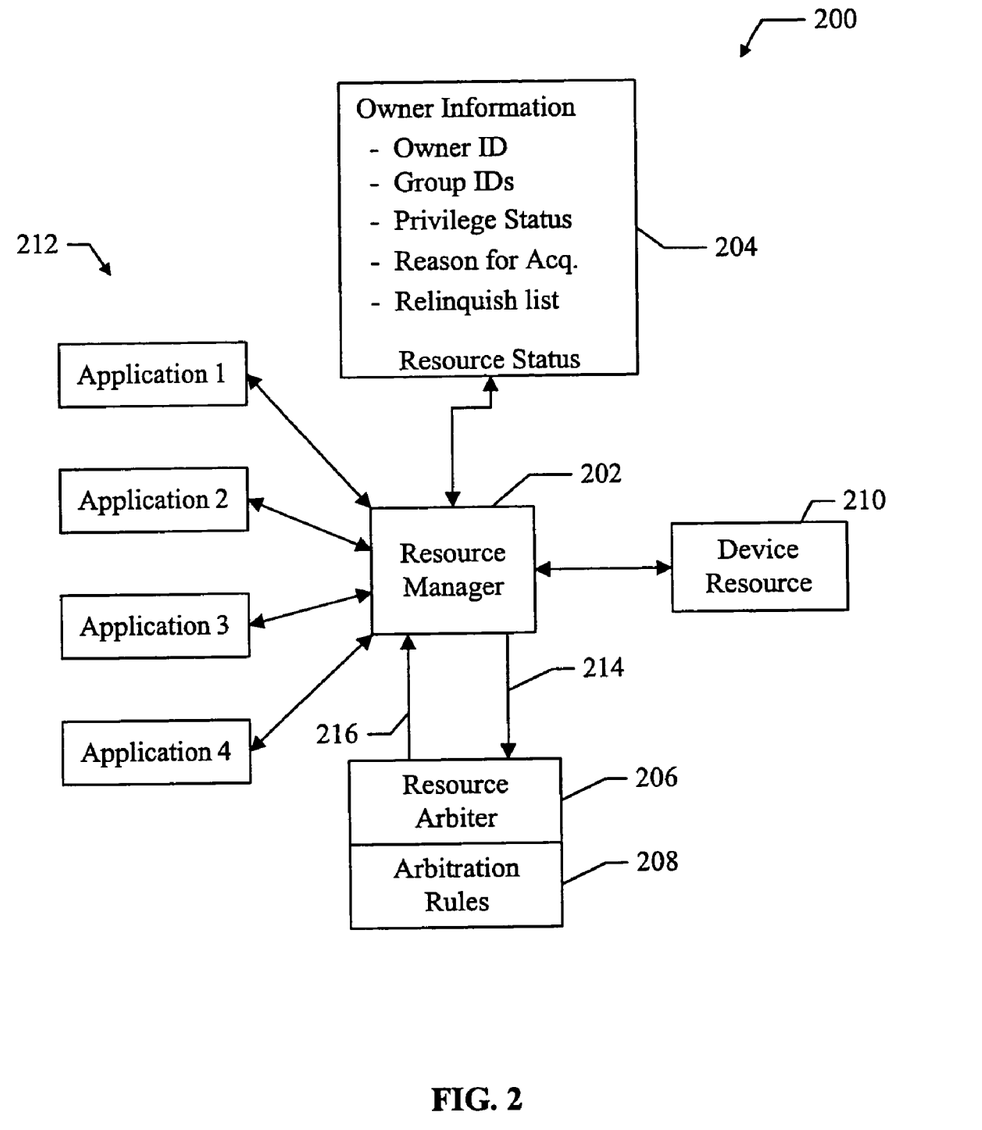
FIG. 2 shows a functional diagram of one embodiment of a dynamic allocation system for allocating device resources in a device.

FIG. 2 shows a functional diagram of one embodiment of a dynamic arbitration system 200 for allocating device resources in a device, for example, the device 102 shown in FIG. 1. The dynamic arbitration system 200 comprises a resource manager 202, resource status 204, resource arbiter 206, and arbitration rules 208. Also shown are a device resource 210 and applications (1-4) that execute on the device and are generally shown at 212.

The resource manager 202 comprises a CPU, processor, gate array, discrete logic, or other hardware or software, or any combination thereof, and operates to manage the device resource 210. The device resource 210 may comprise any type of device resource as described above.

The resource status 204 comprises hardware, software or any combination thereof. In one embodiment, the resource status 204 comprises information about the device resource 210 and/or information about the current resource owner (owner information). For example, an application that is currently allocated the device resource 210 is considered to be the resource owner, current owner, or owning application. For example, in one embodiment, the resource status 204 comprises information about the current owner that comprises a current owner identifier (ID), one or more Group IDs, privilege status, reason for acquiring the resource, a relinquish list, and/or any other information about the current owner or the device resource 210. In one embodiment, the relinquish list identifies what applications or groups (i.e., privilege classes) the current owner is willing to release the device resource 210 to. In one embodiment, this list is controlling during the arbitration process conducted by the resource arbiter 206. In another embodiment, this relinquish list is considered to be only a recommendation to the resource arbiter 206 as to how arbitrations should be decided. The resource manager 202 operates to maintain, update, change, add, delete, or otherwise process the information that is comprised in the resource status 204.

The resource arbiter 206 comprises hardware, software or any combination thereof, and operates to arbitrate access to the device resource 210 using the arbitration rules 208. For example, in one embodiment, the resource arbiter 206 may be a program module and the arbitration rules 208 may be parameters stored in a memory that are retrieved by the resource arbiter 206 and processed to dynamically allocate the device resource 210. In one or more embodiments, the resource manager 202 and the resource arbiter 206 may be implemented as downloadable extensions to the runtime environment executing on the device; for example, they may be downloadable BREW extensions.

During operation of one embodiment of the dynamic arbitration system 200, one or more of the applications 212 request access to the device resource 210 from the resource manager 202. If the device resource 210 is currently owned by another application, the resource manager 202 responds by assembling an arbitration request that comprises information about the requesting application (requester information) and information about the current owner (owner information) of the device resource 210 that is derived from the resource status 204. The arbitration request is sent to the resource arbiter 206, as shown at 214. The resource arbiter 206 processes the arbitration request using the arbitration rules 208 to produce an arbitration decision that is sent back to the resource manager 202, as shown at 216. The resource manager then operates to allocate the device resource 210 according to the arbitration decision.

In one embodiment, the applications 212 may have a set of group IDs, one of which determines whether a particular application is privileged with respect to the device resource 210. For example, a group ID is associated with a set of rights that apply to all applications having that group ID. One of the rights defines the privilege status of the application with respect to the device resource 210. When an application first obtains access to the device resource 210, it provides information to the resource manager 202 (via the allocation request) that includes its set of group IDs, and a reason for wanting access to the device resource 210. The reason for wanting access to the device resource 210 is selected from one of several enumerated types. If the application is privileged, as determined from its group ID, it may restrict what applications can take the device resource 210 away. For example, the application may specify a relinquish list that identifies applications to which the device resource 210 will be relinquished. For example, the applications in the relinquish list may be identified by their group ID.

When another application requests access to the device resource 210, the resource manager generates an arbitration request that includes information about the current resource owner (owner information) and information about the requesting application (requester information). As part of the arbitration request, the privilege status or the resource owner and requester are passed to the resource arbiter 206 along with their associated reasons for wanting the resource and any relinquish list. The information passed to the resource arbiter 206 may also comprise any other parameters or criteria. For example, the information passed to the resource arbiter 206 may include user preferences, current device operating mode, carrier preferences, or any other type of information that may be used to arbitrate the request. The resource arbiter 206 then uses this information to determine how the device resource 210 is to be allocated.

In one embodiment, the current resource owner may dynamically change its priority with respect to the device resource 210. For example, an application may have a group ID that provides privileges allowing it a high priority with which to obtain a device resource 210. After initial access to the device resource 210, where other applications are restricted from obtaining the device resource 210, the application may change its priority and thereby allow other applications to obtain access to the device resource 210. For example, the application may change the reason it needs the device resource, or change its relinquish list so that other applications are able to obtain the device resource. Thus, the dynamic arbitration system 200 operates to provide flexibility to the resource-owning application to either release the device resource 210, or make the device resource 210 easier for other applications to access.

In another embodiment, the dynamic arbitration system 200 provides a callback mechanism that allows an application to register a callback function. The callback function allows the dynamic arbitration system 200 to notify the application when there is a change of status of the device resource 210. For example, the callback function can be used to notify an application when a device resource 210 is free, or when a device resource 210 is busy because it is allocated to another application.

Thus, the dynamic arbitration system 200 operates to dynamically allocate access to one or more device resources 210 on the device 102. For example, in one embodiment, the device 102 may comprise a resource manager for each device resource 210 on the device. The resource arbiter 206 communicates with each resource manager to process arbitration requests pertaining to each device resource 210, respectively. Furthermore, the resource arbiter 206 may use the same or different arbitration rules 208 for each device resource 210. To provide dynamic operation, the resource arbiter 206 and arbitration rules 208 may be downloaded to the device 102 from a network entity, thereby allowing a third party to have input as to how device resources 210 are allocated on the device 102. For example, in one embodiment, the device 102 is a wireless telephone and the resource arbiter 206 and arbitration rules 208 are downloaded to the device 102 from a network server that is part of a nationwide telecommunication carrier network. In this way, the telecommunication carrier is provided an input as to how the device resource 210 is allocated on the device 102.

Figure 3:
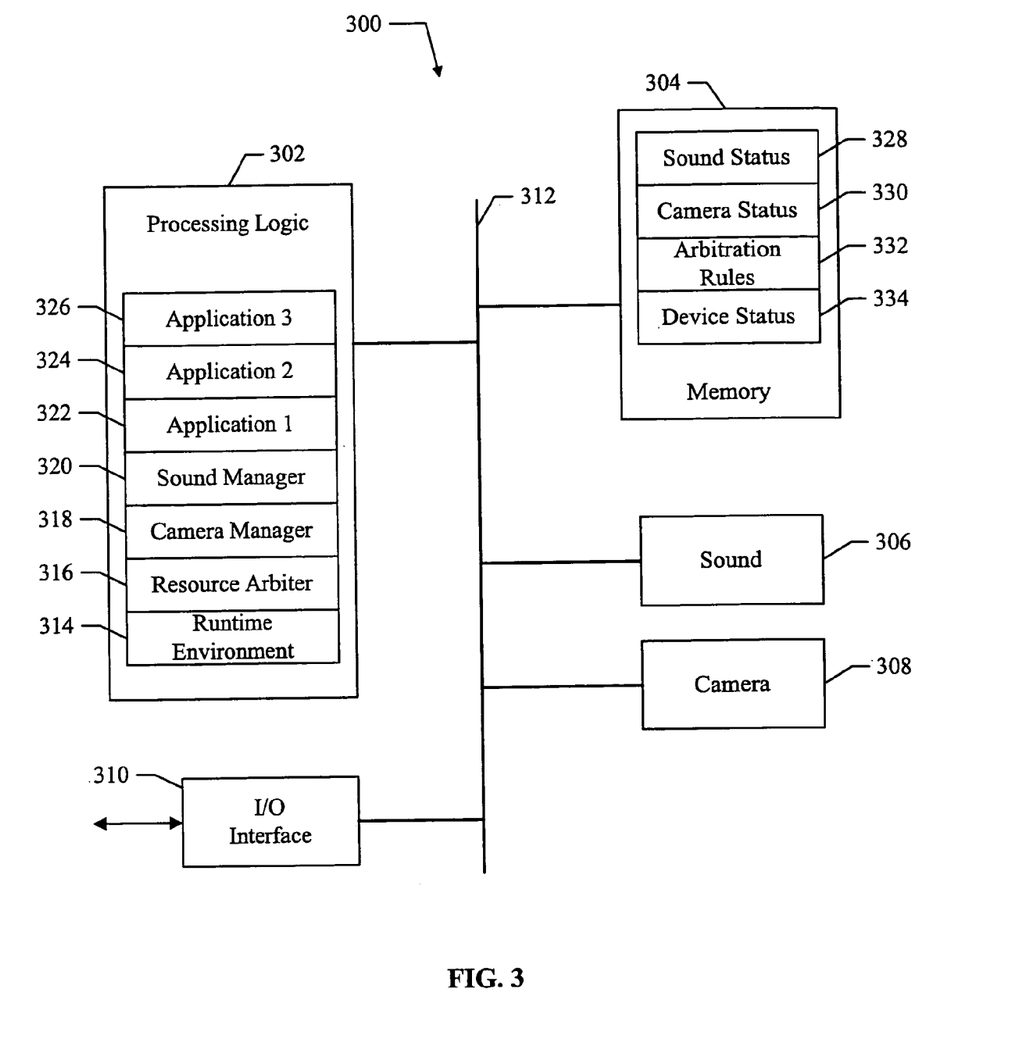
FIG. 3 shows one embodiment of a device that includes one embodiment of a dynamic arbitration system.

FIG. 3 shows one embodiment of a device 300 that includes one embodiment of a dynamic arbitration system. The device 300 comprises processing logic 302, memory 304, sound logic 306, camera logic 308, and I/O interface 310 all coupled to an internal data bus 312. For the purpose of clarity, it will be assumed that the sound logic 306 and the camera logic 308 are the only device resources in the device 300 that can be allocated to applications executing on the device 300. However, it should be noted that one or more embodiments of the dynamic arbitration system are suitable for use with other devices having more or less resources and/or different functional elements.

The processing logic 302 comprises a CPU, processor, gate array, discrete logic, or other hardware or software, or any combination thereof. Thus, the processing logic 302 generally comprises logic to execute machine-readable instructions to perform the functions described herein. For example, instructions may be loaded into the device 300 from a computer-readable media, such as a floppy disk, CDROM, Flash memory, or other computer-readable media that interfaces with the device 300 via the interface 310. In another embodiment, the instructions may be downloaded into the device 300 from a network resource, such as a network server or any other type of network resource via the interface 310. The instructions, when executed by the processing logic 302 provide one or more embodiments of the dynamic arbitration system as described herein.

The memory 304 comprises any type of RAM, ROM, hard disk, floppy disk, Flash memory, or any other type of memory device. The sound logic 306 comprises logic to control a sound device, such as a speaker, amplifier, sound processor, or any other type of sound device. The camera logic 308 comprises logic to control to a camera device, such as a CCD camera, or any other type of camera device. The I/O interface 310 comprises hardware and/or software or any combination thereof to allow the device 300 to interface with external devices or systems. For example, the I/O interface 310 comprises logic to interface to external storage systems, such as disk drives or other memory devices. The interface 310 also comprises logic to interface to an external system, such as a local computer system. In addition, the interface also comprises logic to interface with data network allowing communication with remote computers and servers.

During operation of one embodiment of the device 300, program instructions executed by the processing logic 302 activate a runtime environment 314. For example, the runtime environment may be the BREW runtime environment 314. In one embodiment, the execution of program instructions also activates a sound manager 320 and camera manager 318. The sound manager 320 operates to control the sound resource 306 to allow applications running on the device 300 to control sounds outputted from the device 300. The camera manager 318 operates to control the camera resource 308 to allow applications running on the device 300 to obtain images and video from a camera device. In another embodiment, the sound manager 320 and/or the camera manager 318 may comprise a CPU, processor, gate array, discrete logic, or other hardware or software, or any combination thereof.

The sound manager 318 and the camera manager 320 receive requests to access the device resources they control from applications (322, 324, 326) running on the device. The applications (322, 324, 326) may be any type of applications suitable for execution on the device 300. For example, the applications may be multimedia applications, calendar applications, email applications, or any other type of application which when executed on the device provides useful features and/or functions. To facilitate the allocation of the device resources, the sound manager 320 and the camera manager 318 maintain status information for each respective device resource in the memory 304. For example, the sound manager 320 maintains sound status information 328 in the memory 304. The sound status 328 identifies various parameters associated with the allocation and use of the sound resource 306. Likewise, the camera manager 318 maintains camera status information 330 in the memory 304. The camera status 330 identifies various parameters associated with the allocation and use of the camera resource 308. The device status 334 identifies the current operating mode of the device, for example, the device operating mode may be idle, running an application, receiving a message, processing a voice call, playing a game, or be in any other type of device operating mode.

As the applications (322, 324, 326) execute on the device 300, they submit requests to the sound manager 318 and the camera manager 320 to access the associated device resources. The requests are processed to allocate each of the sound resource 306 and the camera resource 308 to selected applications. In the case where a device resource is currently unallocated, that device resource may be easily allocated to a requesting application. However, if a device resource is currently allocated to one application, any request to access that device resource from another application needs to be arbitrated to determine which application will be allocated the device resource.

In one or more embodiments, the dynamic arbitration system operates to arbitrate the allocation of a device resource to one of the applications executing on the device 300. For example, an application submits a request for a device resource to the appropriate resource manager. If the device resource is currently allocated to another application, the resource manager submits an arbitration request to the resource arbiter 316. The arbitration request includes information about the requesting application (requester information) and information about the current owner of the device resource (owner information). For example, information about the current owner of the device resource is maintained in the corresponding resource status information.

In one embodiment, the resource arbiter 316 processes the arbitration request according to arbitration rules 332 stored in the memory 304. For example, in one embodiment, the arbitration rules 332 are downloaded to the device 300 from a network server so that the network server is able to provide input as to how resource requests are arbitrated in the device 300. A more detailed description of the arbitration process is provided in another section of this document. The arbitration request is processed by the resource arbiter 316 to produce an arbitration decision, which is returned to the resource manager that submitted the arbitration request. The resource manager then allocates the device resource based on the arbitration decision.

It should be noted that the description of the dynamic arbitration system shown in the device 300 illustrates just one embodiment, and that other configurations are possible to provide the functions described herein. For example, it is possible that the functional elements of the device 300 be combined, rearranged, changed, added to, or deleted within the scope of the described embodiments.

Resource Arbiter

In one or more embodiments, a resource arbiter 316 is provided that operates as the central decision maker to determine if a device resource can be handed over to a requesting application (or object). In one embodiment, the resource arbiter 316 is installed on the device 300 during manufacture. In another embodiment, the resource arbiter 316 is customizable by a network server and is implemented as a downloadable module that may be updated or replaced as desired. For example, in an implementation where the device 300 is a wireless telephone, the resource arbiter 316 may be customized and downloaded to the telephone from a network server operated by a communications OEM/carrier. Preferably, a single resource arbiter 316 is used to arbitrate requests for all device resources on a device 300; however, it is also possible to use multiple arbiters on a device 300 within the scope of the described embodiments.

In one embodiment, the resource arbiter 316 is passed a variety of information from a resource manager, and that information is used to produce an arbitration decision. In one embodiment, the information that is passed to the resource arbiter 316 comprises information about the requesting application (requester information) and information about the current owner of the device resource (owner information). However, in other embodiments, additional types of information are passed to the resource arbiter and this additional information comprises device status information 334, user preference information, third party preference information, and any other type of information suitable for use by the resource arbiter to produce an arbitration decision.

Additionally, in one embodiment, the resource arbiter is extensible so that the arbitration process may be modified to use different information items during different time periods or operating conditions to render an arbitration decision. The following represents a brief description of the requester and owner information that may be passed to the resource arbiter 316 in order to produce an arbitration decision, however, the information that may be passed to the resource arbiter is not limited to the list shown.

A. Resource Owner Information
1. Owner class identifier (CLSID) and instance pointer
2. Reason for acquisition of resource
3. Relinquish control information
   a. Relinquish Identifier List
   b. List count (−1=all, 0=none, otherwise count)

B. Requester Information
1. Requester class identifier (CLSID) and instance pointer
2. Reason for acquisition of resource
3. Relinquish control information
   a. Relinquish Identifier List
   b. List count (−1=all, 0=none, otherwise count)

Figure 4:
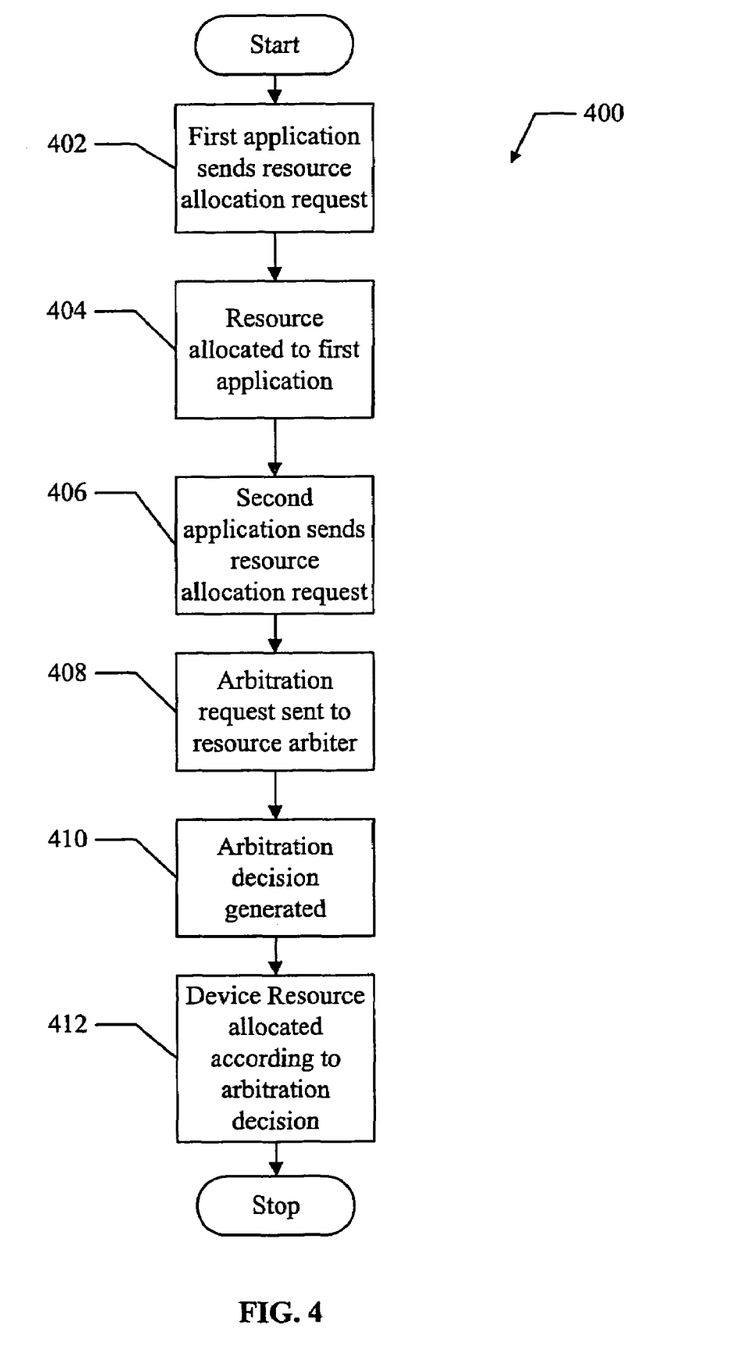
FIG. 4 shows one embodiment of a method for providing one embodiment of a dynamic arbitration system for use in a device.

FIG. 4 shows one embodiment of a method 400 for providing one embodiment of a dynamic arbitration system for use in a device 300. For the purpose of clarity, the operation of the method 400 will be described with reference to the device 300 shown in FIG. 3. For example, the method 400 shows how in one embodiment, the sound resource 306 is dynamically allocated to the applications 322, 324, and 326.

At block 402, a first application sends a resource allocation request to the resource manager associated with the device resource. For example, application 322 sends a resource allocation request to the sound resource manager 320 to request allocation of the sound resource 306. The allocation request includes information about the application 322; for example, the request includes requester information as described above.

At block 404, the resource manager allocates the device resource to the first application. For example, because the sound resource 306 is currently available, the sound resource manager 320 allocates the sound resource 306 to the application 322. Additionally, the sound resource manager 320 uses the requester information provided in the allocation request to update the resource owner information described above. The resource owner information is then stored in the sound status 328.

At block 406, a second application sends a resource allocation request to the resource manager associated with the device resource. For example, application 324 sends a resource allocation request to the sound resource manager 320 to request allocation of the sound resource 306. The allocation request includes information about the application 324; for example, the allocation request includes requester information as described above.

At block 408, the resource manager sends an arbitration request to the resource arbiter 316. For example, the sound resource manager 320 sends an arbitration request to the resource arbiter 316. The arbitration request includes resource owner information from the sound status 328 and resource requester information from the allocation request. Thus, the arbitration request provides the resource arbiter 316 with information about the current owner and current requester of the sound resource 306.

At block 410, the resource arbiter 316 generates an arbitration decision that indicates which application should be allocated the device resource. For example, the resource arbiter 316 generates the arbitration decision and transmits the decision to the sound resource manager 320. The resource arbiter 316 generates the arbitration decision based on the arbitration rules 332 stored in the memory 304. In one embodiment, the resource arbiter 316 and the arbitration rules 332 are downloaded from a third party, such as an OEM/carrier, which allows updating and also provides a mechanism for the third party to decide how device resources are allocated on the device 300. A more detailed description of how the resource arbiter 316 generates the arbitration decision is provided in another section of this document.

At block 412, the resource manager allocates the device resource based on the arbitration decision. For example, the sound resource manager 320 allocates the sound resource 306 to either the first application 322 or the second application 324 based on the arbitration decision. The sound resource manager 320 also updates the sound status 328 with any new resource owner information.

Thus, the method 400 operates to provide one embodiment of a dynamic arbitration system for use in a device 300.

It should be noted that the method 400 illustrates just one embodiment and that it is possible to rearrange, change, combine, add, or delete method steps within the scope of the described embodiments. For example, it is possible for an application to register a callback function with a resource manager so that the status and/or availability of a device resource can be provided to the application as desired. Thus, it is possible that additional ancillary functions be provided by the arbitration system and that these ancillary functions are within the scope of the described embodiments.

IMPLEMENTATION EXAMPLE

The following describes an implementation example of one embodiment of a dynamic arbitration system that operates to allocate device resources in a device. Examples of device resources to be managed are audio (device or volume) device resources or visual (display) device resources. In one embodiment, the system comprises a resource manager that provides a generic means for applications (objects), including BREW applications, to control device resource access. The resource manager also coordinates and manages the acquisition and freeing of device resources by objects and also operates to notify registered objects when the state of a device resource changes.

Some types of device resources can only be used by one application at a time. For example, a sound interface resource allows only one application to use the sound output. The system provides arbitration (i.e., resource arbiter 316) to determine which application is allowed to control a device resource.

Figure 5:
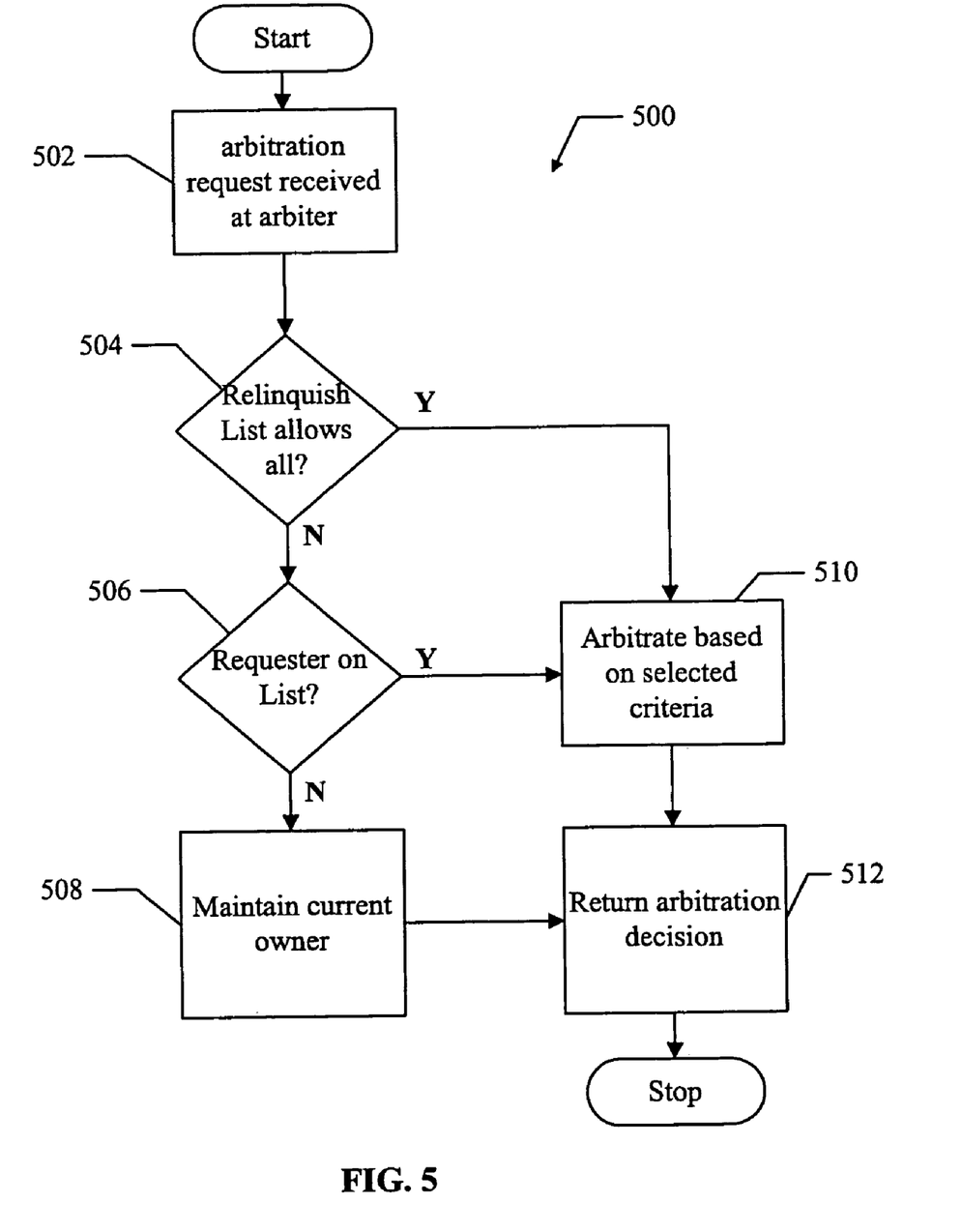
FIG. 5 shows one embodiment of a method for operating a resource arbiter to provide one embodiment of a dynamic arbitration system.

FIG. 5 shows one embodiment of a method 500 for operating a resource arbiter to provide one embodiment of a dynamic arbitration system. For the purpose of clarity, the operation of the method 500 will be described with reference to the device 300 shown in FIG. 3. Thus, in one embodiment, the method 500 is implemented by the resource arbiter 316 shown in FIG. 3.

At block 502, an arbitration request is received at the arbiter. For example, the camera manager 318 submits the arbitration request to the arbiter 316. The arbitration request comprises information about the current owner of the camera resource 308, and information about the application requesting access to the camera resource 308.

At block 504, a test is performed on the relinquish list provided by the current owner of the camera resource 308 to determine to which applications the current owner will relinquish control of the camera resource 308. The relinquish list is part of the current owner information provided in the arbitration request. If the relinquish list specifies that any application can obtain control of the camera resource 308, the method proceeds to block 510. If the relinquish list specifies that either no applications or only specific applications can obtain control of the camera resource 308, the method proceeds to block 506.

At block 506, a test is performed to determine if the requesting application is one of the applications identified in the relinquish list. For example, the relinquish list specifies group IDs or application IDs that can be used to identify selected applications. If an ID that identifies the requesting application is specified in the relinquish list, the method proceeds to block 510. If the requesting application is not specified in the relinquish list, the method proceeds to block 508.

At block 508, an arbitration decision is made to maintain the current owner of the camera resource 308. Because the current owner is privileged and the requesting application is not on the relinquish list, the request for allocation of the camera resource 308 by the requesting application is denied. The method then proceeds to block 512 where the arbitration decision is returned to the camera manager 318.

At block 510, the arbitration request from the requesting application is arbitrated based on selected criteria. For example, in one embodiment, the request is arbitrated based on the arbitration rules 330. Virtually any criteria can be used to determine which application will be allocated the camera resource 308. For example, the arbitration may be based on the reason each application wants the camera resource 308, the operating mode of the device, user preferences, carrier preferences, or any other criteria. After the arbitration decision is determined, the method proceeds to block 512 where the arbitration decision is returned to the camera manager 318.

Figure 6:
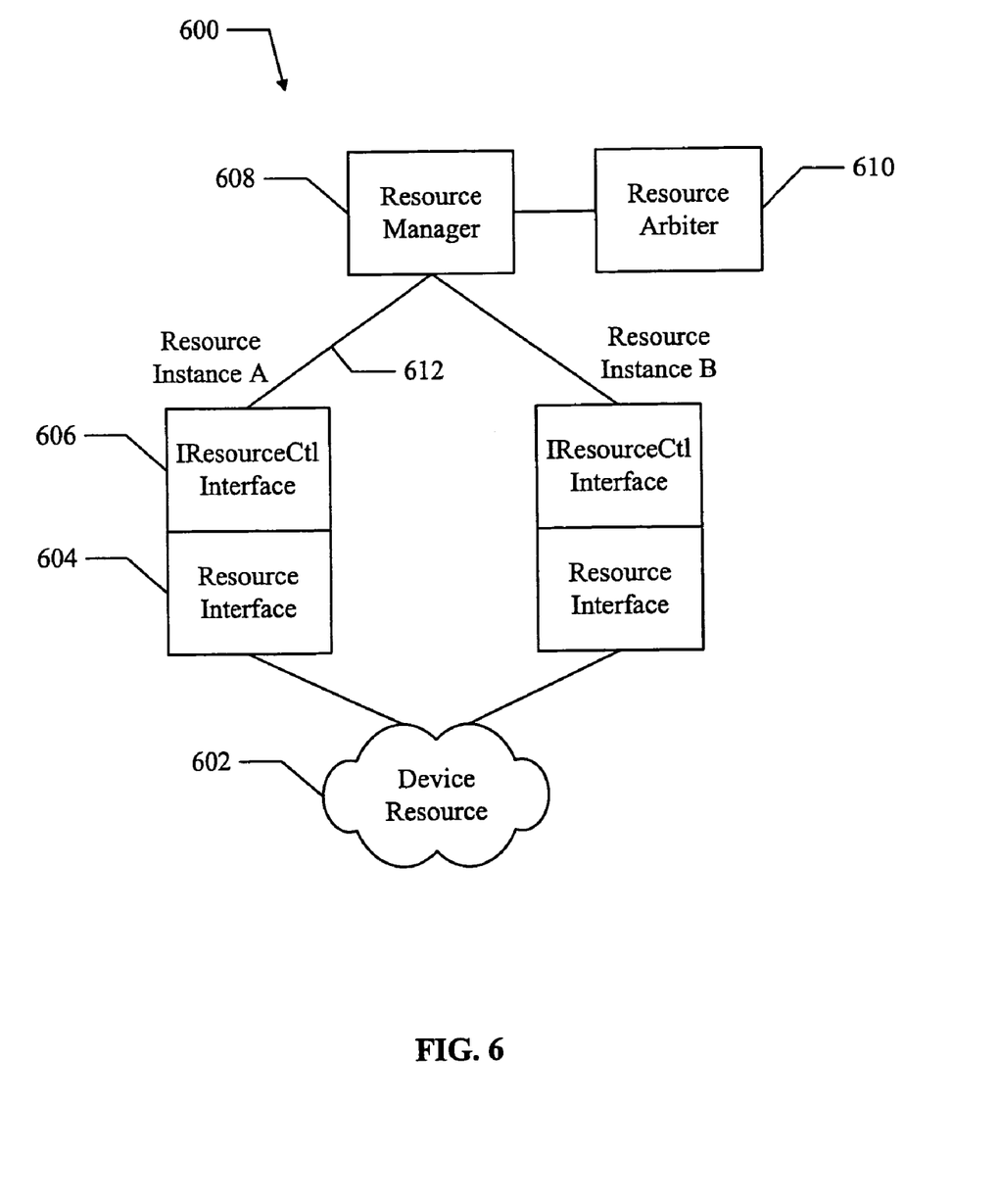
FIG. 6 shows one embodiment of a resource control architecture suitable for use with one or more embodiments of a dynamic arbitration system.

FIG. 6 shows one embodiment of a resource control architecture 600 suitable for use with one or more embodiments of a dynamic arbitration system. For each Device Resource 602 being managed, there is a Resource Interface 604 that controls the object, an IResourceCtl Interface 606 for controlling access, and a Resource Manager 608. Additionally, a Resource Arbiter 610 is shared among all device resources.

When an instance of the Resource Interface 604 is created, it includes the IResourceCtl instance 612. The IResourceCtl Instance 612 interacts with the Resource Manager 608 to acquire and free the underlying Device Resource 602. It should be noted that even if one application has control of a Device Resource 602, another application could take control of the same Device Resource 602 at any time based on the existing arbitration rules.

Figure 7:
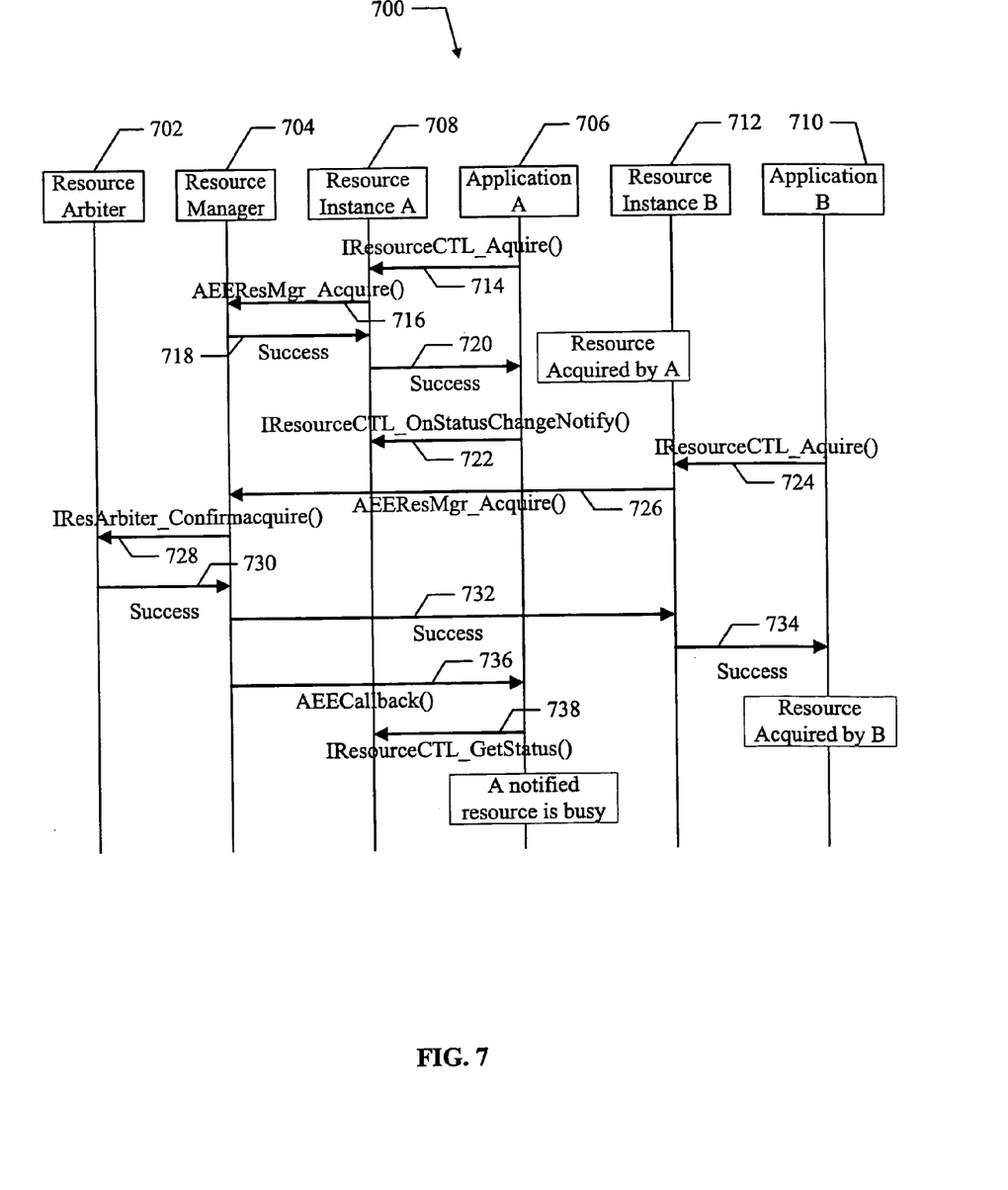
FIG. 7 shows an example of how a device resource is allocated between two applications in accordance with one or more embodiments of a dynamic arbitration system.

FIG. 7 shows a diagram 700 that illustrates an allocation example that describes how a device resource is allocated between two applications in accordance with one or more embodiments of a dynamic arbitration system. For example, the diagram 700 shows the interaction between various device entities comprising a Resource Arbiter 702, Resource Manager 704, Application A 706, Resource Instance A 708, Application B 712, and Resource Instance B 714.

In the beginning of the allocation example, Application A 706 issues a resource request 714 to Resource Instance A 708 to acquire a device resource managed by the Resource Manager 704. The resource request is forwarded from Resource Instance A 708 to the Resource Manager 704, as shown by 716. It will be assumed that at this point in time the device resource is unallocated, so that the Resource Manager 704 allocates the device resource to the Application A 706 and issues a "success" indicator that flows back to the Application A 708, which is shown at 718 and 720. At this point, the device resource has been acquired by the Application A 708. Additionally, the Application A 706 registers a callback function with the Resource Instance A 708 to receive information about any status changes with regards to the device resource, as shown at 722.

Later, Application B 710 issues a resource request 724 to the Resource Instance B 712 to acquire the device resource managed by the Resource Manager 704. The resource request is forwarded from Resource Instance B 712 to the Resource Manager 704, as shown by 726. The request from Application B 710 causes the Resource Manager 704 to request arbitration from the Resource Arbiter 702, as shown at 728. The Resource Arbiter 702 processes the arbitration request 730 in accordance with the embodiments described herein. The Resource Arbiter 702 provides an arbitration result that indicates that the device resource was successfully allocated to Application B 710, as shown by 730, 732, and 734. Therefore, at this point, Application B 710 has acquired the device resource. Because the Application A 706 registered for status change notifications (at 722), Application A 706 is alerted via a callback function 736 because the status of the device resource has changed. Thus, in response to the callback, the Application A 706 issues a "get status" command 738 that returns a notification that the device resource has been allocated to another application and is now busy.

Customizing the Resource Arbiter

The resource arbiter is the central decision maker that determines if a device resource can be handed over to the requesting object. The resource arbiter module is customizable by the OEM/Carrier and may be implemented as a downloadable module using a class identifier (CLSID). There is a single resource arbiter (IResArbiter) implementation for all device resources. In one embodiment, the resource arbiter method, IResArbiter_ConfirmAcquire, is passed the Resource owner's information and the requester information as described above in order to produce the arbitration decision.

If the current owner has specified a relinquish CLSID list, and the requester is identified in the list of the application IDs or group IDs specified, or if the owner allows any ID (as in the case of a non-privileged owner), then the arbiter may decide to transfer ownership based on the rest of the information provided (the simplest implementation grants the request). If the requester is not identified on the relinquish CLSID list, the arbiter rejects the request. The following is a sample implementation of the ConfirmAcquire method for the Resource Arbiter suitable for use in a device executing a BREW runtime environment.

```
int OEMResArbiter_ConfirmAcquire(IResArbiter * po, AEECLSID
    clsReq,AEEResCtlInfo * pOwner, AEEResCtlInfo * pRequester)
{
    CResArbiter * pMe = (CResArbiter*)po;
    int status = EITEMBUSY;
    int i;
    //
    // first check class list to see if owner will allow it
    //
    switch (pOwner->nClsCount)
    {
    case -1:         // allow anyone to acquire resource
        status = SUCCESS;
        break;
    case 0:          // allow no one to acquire resource
        status = EITEMBUSY;
        break;
    default:         // check access (relinquish) list
        for (i=0; i<pOwner->nClsCount;i++)
        {
            uint32 privId = pOwner->pClsList[i];
            if (privId < QVERSION)
            {
            // is reason acceptable?
                if (privId == pRequester->dwReason)
                {
                    status = SUCCESS;
                    break;
                }
            }
            else
            {
                // does requester class id match or has group
                privilege?
                if (ISHELL_CheckPrivLevel(pMe->m_pIShell,
                    privId, TRUE))
                {
                    status = SUCCESS;
                    break;
                }
            }
        }
        break;
    }
// At this point, an OEM may choose to accept the access list
// permission checks and/or add additional decision algorithms
   such
// as examining the current reason for access or allowing specific
// requester CLSID's regardless of the owner's access list, etc.
    return (status);
}
```

Accordingly, while one or more embodiments of a dynamic arbitration system for use in a device have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A method for arbitrating the allocation of a device resource on a device, the method comprising:
    receiving a request from a requesting application that requests allocation of the device resource;
    determining that the device resource is owned by an owning application;
    associating owner information with requester information to form an arbitration request, wherein the owner information comprises a first privilege status which defines the priority of the owning application and the requester information comprises a second privilege status which defines the priority of the requesting application;
    arbitrating the arbitration request based on the priorities defined by the first and second privilege status to produce an arbitration decision
    maintaining ownership of the device resource by the owning application when the arbitration decision determines the first privilege status is greater than the second privilege status; and
    relinquishing ownership of the device resource by the owning application and allocating the device resource to the requesting application when the arbitration decision determines the second privilege status is greater than the first privilege status.

2. The method of claim 1, wherein the step of arbitrating is performed by a resource arbiter, and wherein the method comprises downloading the resource arbiter to the device.

3. The method of claim 1, wherein the owner information comprises a relinquish list and the step of arbitrating comprises determining the arbitration decision based on the relinquish list.

4. The method of claim 1, wherein the step of arbitrating comprises determining the arbitration decision based on any information selected from a set of information items comprising the owner information, the requester information, device status information, device operating mode information, user preference information, and third party preference information.

5. The method of claim 1, wherein the device is a wireless device.

6. Apparatus for dynamically arbitrating the allocation of a device resource on a device, the apparatus comprising:
a resource manager comprising:
logic to receive a request from a requesting application that requests allocation of the device resource;
logic to determine that the device resource is owned by an owning application; and
logic to associate owner information with requester information to form an arbitration request, wherein the owner information comprises a first privilege status which defines the priority of the owning application and the requester information comprises a second privilege status which defines the priority of the requesting application;
logic to arbitrate the arbitration request based on the priorities defined by the first and second privilege status to produce an arbitration decision
logic to maintain ownership of the device resource by the owning application when the arbitration decision determines the first privilege status is greater than the second privilege status; and
logic to relinquish ownership of the device resource by the owning application and allocate the device resource to the requesting application when the arbitration decision determines the second privilege status is greater than the first privilege status.

7. The apparatus of claim 6, wherein the logic to arbitrate comprises a software module that is downloaded to the device.

8. The apparatus of claim 6, wherein the owner information comprises a relinquish list and the logic to arbitrate operates to determine the arbitration decision based on the relinquish list.

9. The apparatus of claim 6, wherein the logic to arbitrate operates to determine the arbitration decision based on any information selected from a set of information items comprising the owner information, the requester information, device status information, device operating mode information, user preference information, and third party preference information.

10. The apparatus of claim 6, wherein the device is a wireless device.

11. Apparatus for arbitrating the allocation of a device resource on a device, the apparatus comprising:
means for receiving a request from a requesting application that requests allocation of the device resource;
means for determining that the device resource is owned by an owning application;
means for associating owner information with requester information to form an arbitration request, wherein the owner information comprises a first privilege status which defines the priority of the owning application and the requester information comprises a second privilege status which defines the priority of the requesting application;
means for arbitrating the arbitration request based on the priorities defined by the first and second privilege status to produce an arbitration decision
means for maintaining ownership of the device resource by the owning application when the arbitration decision determines the first privilege status is greater than the second privilege status; and
means for relinquishing ownership of the device resource by the owning application and allocating the device resource to the requesting application when the arbitration decision determines the second privilege status is greater than the first privilege status.

12. The apparatus of claim 11, wherein the means for arbitrating is performed by a resource arbiter, and wherein the apparatus comprises means for downloading the resource arbiter to the device.

13. The apparatus of claim 11, wherein the owner information comprises a relinquish list and the means for arbitrating comprises means for determining the arbitration decision based on the relinquish list.

14. The apparatus of claim 11, wherein the means for arbitrating comprises means for determining the arbitration decision based on any information selected from a set of information items comprising the owner information, the requester information, device status information, device operating mode information, user preference information, and third party preference information.

15. The apparatus of claim 11, wherein the device is a wireless device.

16. A computer-readable media comprising instructions, which when executed by a processor in a device, operate to dynamically arbitrate the allocation of a device resource in the device, the computer-readable media comprising:
instructions to receive a request from a requesting application that requests allocation of the device resource;
instructions to determine that the device resource is owned by an owning application;
instructions to associate owner information with requester information to form an arbitration request, wherein the owner information comprises a first privilege status which defines the priority of the owning application and the requester information comprises a second privilege status which defines the priority of the requesting application;
instructions to arbitrate the arbitration request based on the priorities defined by the first and second privilege status to produce an arbitration decision
instructions to maintain ownership of the device resource by the owning application when the arbitration decision determines the first privilege status is greater than the second privilege status; and
instructions to relinquish ownership of the device resource by the owning application and allocate the device resource to the requesting application when the arbitration decision determines the second privilege status is greater than the first privilege status.

17. The computer-readable media of claim 16, wherein the instructions to arbitrate are performed by a resource arbiter, and wherein the method comprises instructions for downloading the resource arbiter to the device.

18. The computer-readable media of claim 16, wherein the owner information comprises a relinquish list and the instructions to arbitrate comprise instructions to determine the arbitration decision based on the relinquish list.

19. The computer-readable media of claim 16, wherein the instructions to arbitrate comprise instructions for determining the arbitration decision based on any information selected from a set of information items comprising the owner information, the requester information, device status information, device operating mode information, user preference information, and third party preference information.

20. The computer-readable media of claim 16, wherein the device is a wireless device.

* * * * *